Jan. 14, 1947.  H. L. HULL ET AL  2,414,102
HANDLE CONTROL SYSTEM
Filed July 23, 1941  4 Sheets-Sheet 1

INVENTORS
HARVARD L. HULL
WILLIAM C. HARTMAN
RAYMOND C. GOERTZ
BY Herbert H. Thompson
THEIR ATTORNEY

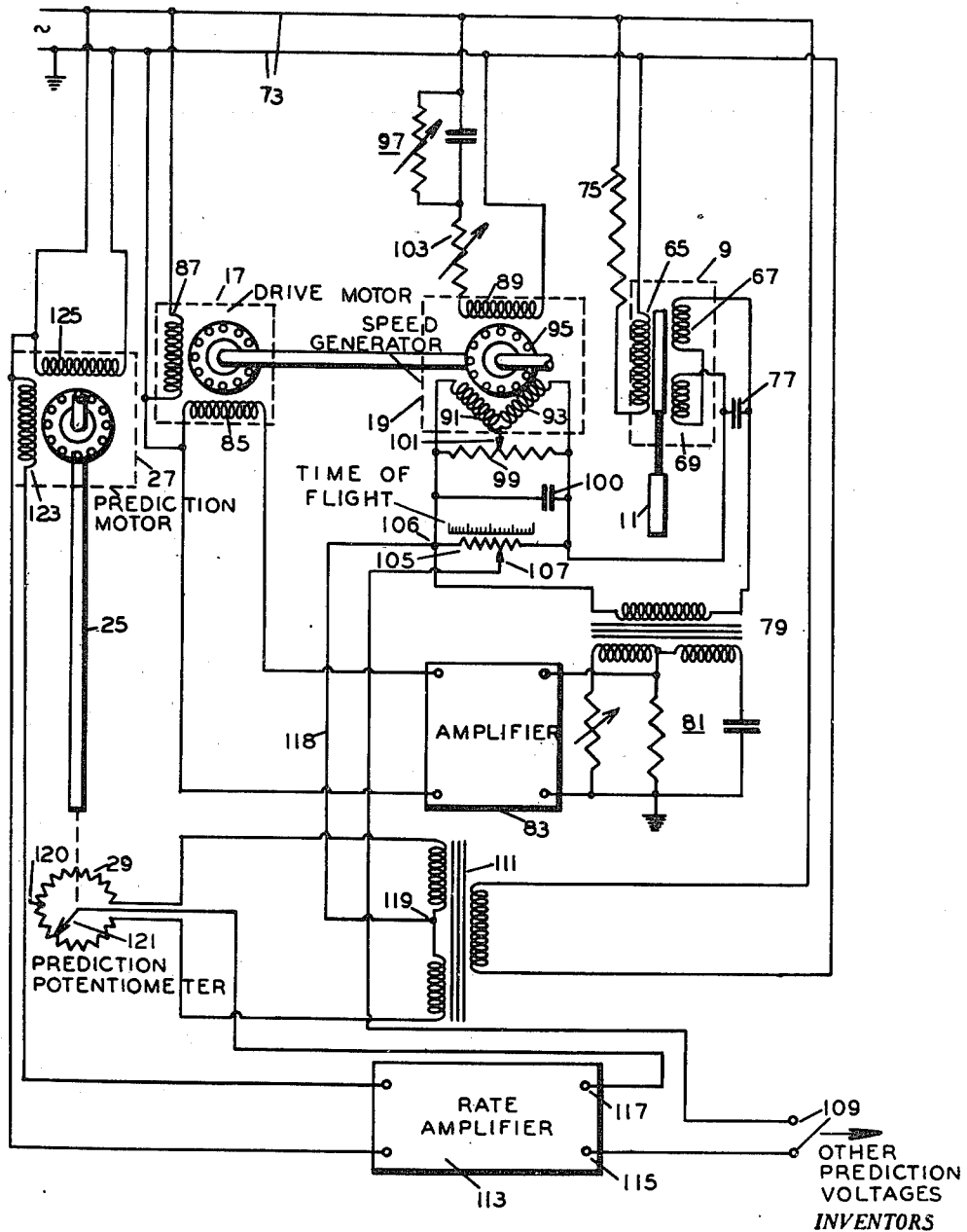

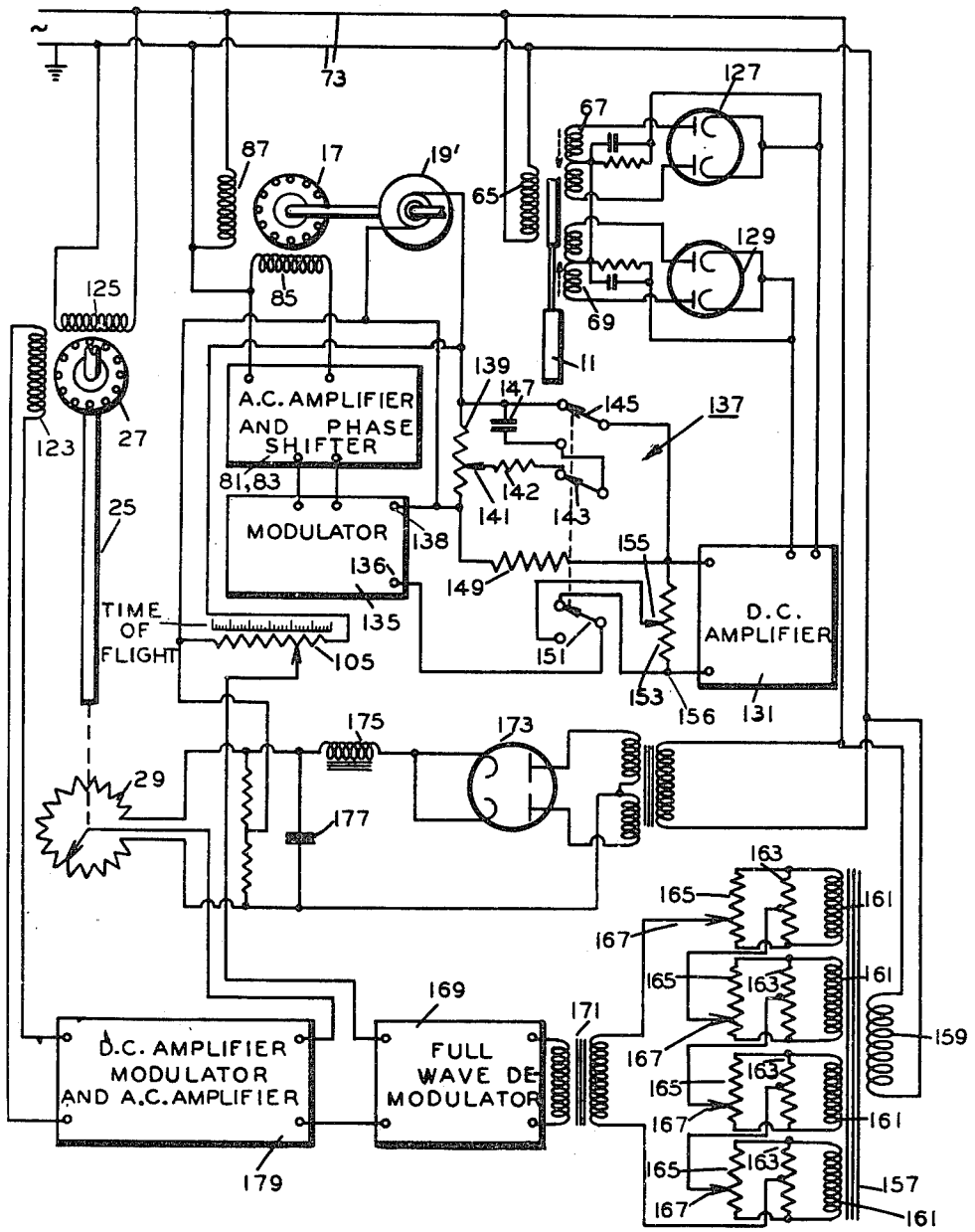

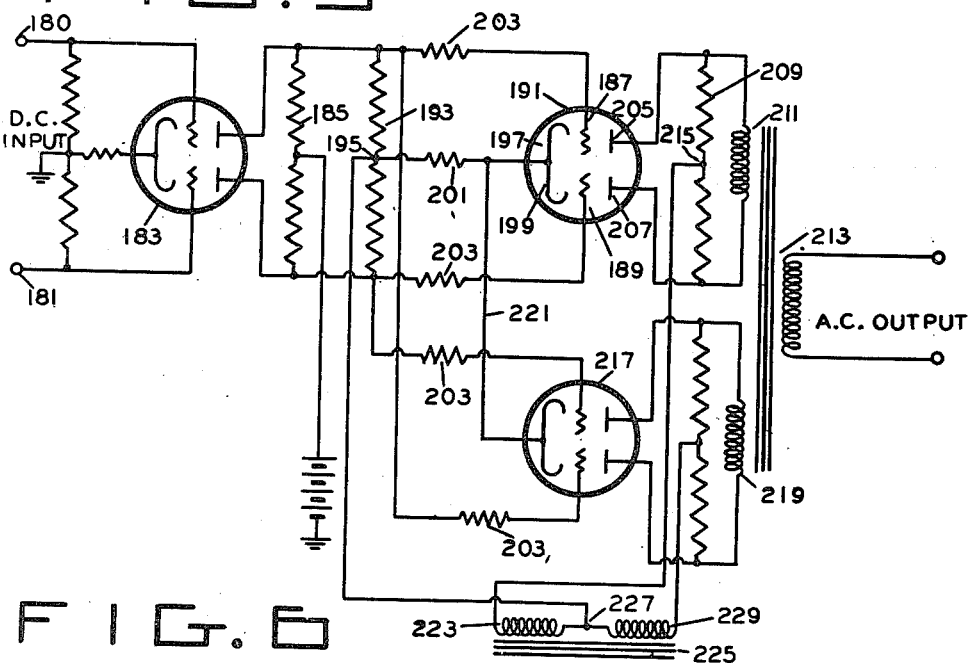
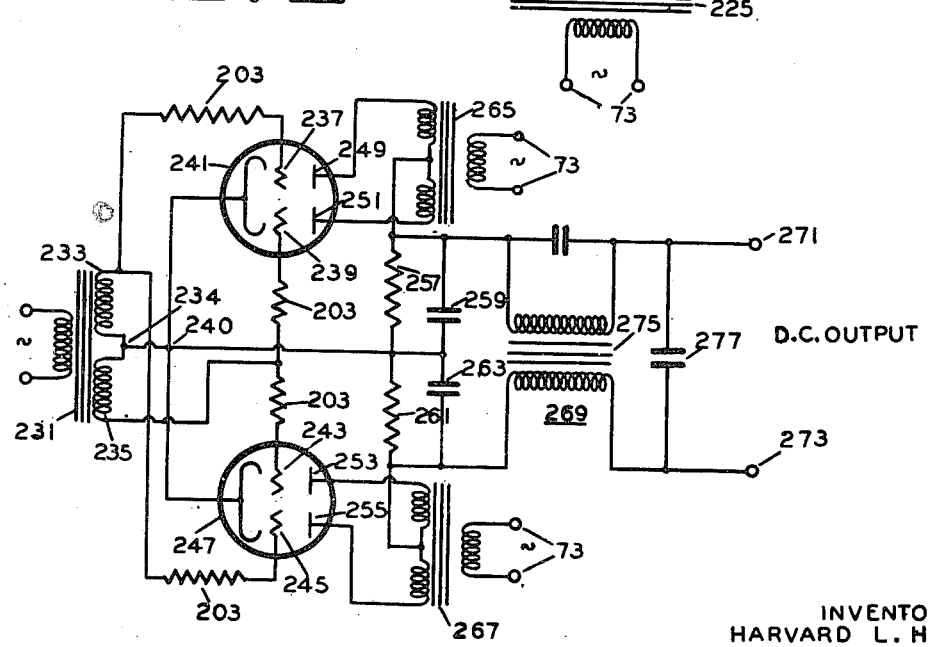

Patented Jan. 14, 1947

2,414,102

UNITED STATES PATENT OFFICE 2,414,102

HANDLE CONTROL SYSTEM

Harvard L. Hull, Garden City, William C. Hartman, Bohemia, and Raymond C. Goertz, Hempstead, N. Y., assignors to Sperry Gyroscope Company, Inc., Brooklyn, N. Y., a corporation of New York Application July 23, 1941, Serial No. 403,618

23 Claims. (Cl. 33—49)

1

The present invention relates, generally, to fire control apparatus, and has reference, more particularly, to sights for gun directors, in which a telescope sight is continuously trained on a target, thereby enabling the production and transmitting of data to cause a gun to be aimed at the target.

In previous devices of this type, control has been obtained by means of a handwheel, whose motion had to be synchronized with motion of the telescope. Also, separate controls for azimuth and elevation were used. These devices were quite satisfactory for low tracking rates. However, with high tracking rates, such as are necessary in close-in aerial combat, proper synchronization of controls and telescope becomes difficult and it is not possible to obtain satisfactory control so as to be able to readily and rapidly manipulate the controls to cause the telescope to track with the course of fast moving targets, and still be steady and precise in operation so that a target once sighted may be continuously followed with ease and accuracy and smooth rates obtained for prediction purposes.

The present invention provides a device which minimizes the difficulties of prior devices. A tracking control system is provided in which the velocity of the sight is controlled by natural and instinctive movements of a single control handle controlling both azimuth and elevation movement of the sight, and whose operation simulates direct manual control of the sight. Precision and steadiness of operation are provided in the type of control unit used, in which the operator can firmly grasp a reference knob, which is fixed with respect to the sight, with part of his hand and the control handle with the rest of the same hand. This provides a steadying influence on the control process, so that extremely fine control is possible. The control handle is made fairly stiff in operation, by a cantilever type mounting, making control mainly by pressure rather than by deflection. In addition, the present system permits complete control with one hand, leaving the operator's other hand free for other duty.

A further feature of the device resides in a switching arrangement whereby the velocity control may be converted to a combined velocity and acceleration control which, under some circumstances, will give constant velocity tracking without any action by the operator, whereby tracking on a target is maintained automatically at a fixed speed. Also, means are provided for compensating the data obtained from the tracking sight for any desired prediction data, and for transmitting the compensated data to a remote point to control the directing of a gun.

Accordingly, it is an object of the present invention to provide a new and improved tracking control system for sights and gun directors.

2

It is also an object of the invention to provide an improved control unit for precise and steady tracking control.

It is a further object to provide an improved control circuit for controlling the tracking velocity of a sight in both azimuth and elevation by manipulation of a single control handle.

It is an additional object to provide improved means for effecting velocity control or combined velocity and acceleration control of a tracking system, at the will of the operator.

It is another object to provide an improved circuit and mechanism for compensating the gun-directing data obtained by the tracking system for any desired prediction data.

It is still a further object to provide an improved modulator circuit for converting direct voltages into alternating voltages whose phase and magnitude correspond to the polarity and magnitude of the direct voltages, for use in tracking control.

It is an additional object to provide an improved demodulator circuit for converting alternating voltages into direct voltages whose polarity and magnitude correspond to the phase and magnitude of the alternating voltages, for use in tracking control.

Other objects and advantages of this invention will become apparent as the description proceeds.

In the drawings,

Fig. 3 shows schematically the circuit diagram of an alternating-current-operated control circuit for the device of Fig. 1;

Fig. 4 shows schematically an alternative direct-current-operated control circuit for the device of Fig. 1, including acceleration control;

Fig. 5 shows a detailed circuit of a push-pull modulator circuit suitable for use with the circuit of Fig. 4; and Fig. 6 shows the detailed circuit of a full-wave phase-sensitive demodulator suitable for use with the circuit of Fig. 4.

Similar characters of reference are used in all of the above figures to indicate corresponding parts.

Figure 2:
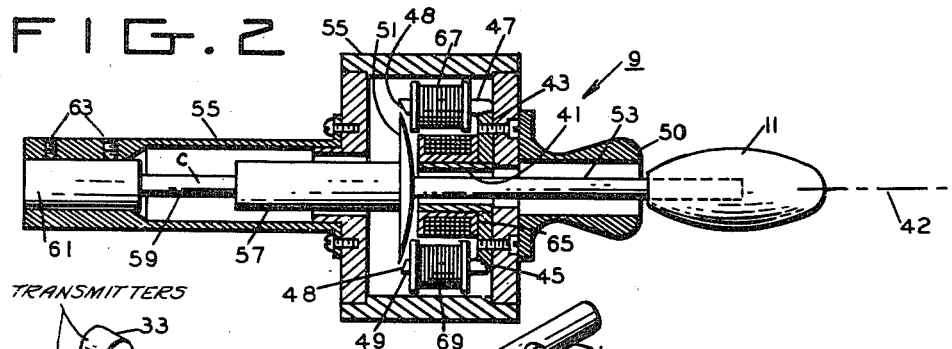
Fig. 2 shows a longitudinal cross-section of the signal pick-up or control unit used in the device of Fig. 1.
Figure 1:
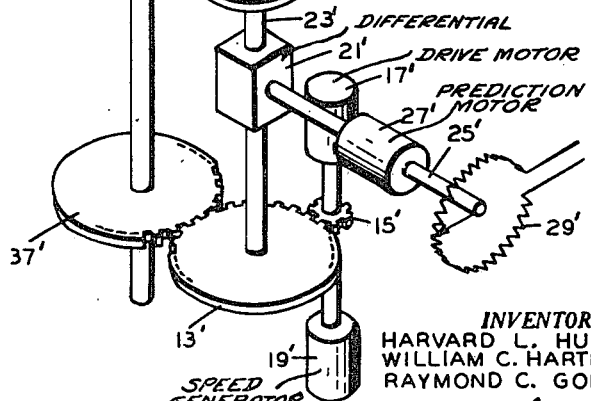
Fig. 1 shows in schematic perspective view the mechanical arrangement of the tracking and prediction control.

Fig. 1 shows the mechanical arrangement of the various elements of the system. The telescope tracking sight 1 is mounted for rotation in azimuth, as by means of vertical shaft 3, and is pivoted about a horizontal axis 2 for rotation in elevation. Horizontal shaft 5 is rotatably mounted on shaft 3 as by a yoke 4 and is positioned parallel to the horizontal axis 2 of sight 1. Shaft 5 is linked to sight 1 as by a linkage 7, 8, so that sight 1 is moved in elevation in synchronism with rotation of shaft 5. Control unit 9, shown in detail in Fig. 2, is fixed to shaft 5 with its control handle 11 parallel to sight 1. Hence, the control unit 9 is relatively fixed with respect to sight 1 and always remains parallel to sight 1, turning with sight 1 both in elevation and azimuth. This gives the operator the sense of actually manually operating the sight 1, by manipulation of control handle 11, since the sight appears to respond to his natural movements in effecting tracking, although actually the control handle 11 merely controls the sight driving mechanism, as described below.

The control handle 11 and its related parts are so shaped and formed as to provide easy and natural manipulation by the operator. For this purpose, referring to Fig. 2, casing 55 has fastened to it a stabilizing or reference knob 50, placed concentric and adjacent to handle 11. Knob 50 is shaped to be gripped by the thumb and fore part of the hand of the operator. This knob 50 is relatively short in length, so that the rear or heel portion of the hand of the operator will at the same time be able to grip the handle 11. The control circuit described below is designed to give full speed control for a relatively small displacement of control handle 11, which may be on the order of ⅛ inch for full displacement. Accordingly, by this device, the operator is given a fixed reference object by which to gage the pressure (or deflection) to be placed on the control handle, while maintaining a firm grasp and positive control of the control handle. The effect is to enable extremely accurate and steady control with a minimum of operator effort. The complete operation is made natural, enabling instinctive reaction to changing conditions needing control adjustment on the part of the operator.

Referring again to Fig. 1, also fastened to horizontal shaft 5 is a gear 13 driven by driving gear 15 which in turn is driven by drive motor 17. Speed generator 19, whose function is described below, is also driven directly by drive motor 17. The drive motor 17 thereby rotates shaft 5, and controls the elevation of sight 1 at a speed which may be proportional to the deflection of, or pressure on, control handle 11, as will be described below. Strict proportionality need not be followed in all cases. For example, it may be desirable to give relatively broad and insensitive control near the neutral axis of the control unit, and relatively sharp and sensitive control at larger velocities.

Also connected to shaft 5 is a differential 21 connected in turn to further shafts 23 and 25. Shaft 25 is positioned by prediction motor 27 which also drives prediction potentiometer 29. Shaft 23 drives a "coarse" self-synchonous transmitter 31 directly, and a "fine" self-synchronous transmitter 33 through suitable gearing 35. The outputs of these transmitters 31 and 33 may go to control the elevation of a remotely situated gun (not shown), which will then be directed (at least in elevation) toward the target being sighted by telescope 1. Prediction motor 27 and differential 21, cause the shaft 23 to lead or lag the shaft 5 by an angle corresponding to any corrections necessary to cause the gun to be directed toward the future position of the target. Such corrections may allow for time of flight of the projectile, super-elevation, wind, air density, etc.

Shaft 3 is driven in azimuth by exactly the same type of system, through a coupling gear 37', thereby giving complete control of the sight and/or gun in elevation and azimuth. Similar elements are given the same reference numbers, but primed.

Fig. 2 shows a cross-section of the control unit 9. This control unit 9 has four symmetric magnetic circuits disposed radially about the longitudinal axis 42 of the unit, only two such circuits being shown in the cross-section taken. These circuits have a common portion 41 formed as a sleeve concentric with axis 42. Extending radially from sleeve 41 are four core members, only two of which (43, 45) are shown. These core members 43, 45 have bent over arms or portions 47, 49 parallel to axis 42. These arms are terminated by slanted portions 48 which are preferably formed to comprise a portion of the surface of a sphere having its center approximately at point C. The magnetic circuits are completed by a button 51 having a spherical surface which cooperates with the spherical-shaped ends 48 of arms 47, 49 to form a uniform air gap between button 51 and each of the arms 47, 49. It is to be understood that each of the two arms not shown is formed in exactly the same manner, but disposed in a plane perpendicular to the plane of the figure.

Button 51 is rigidly fastened to handle 11 as by rod 53, and is resiliently fastened to case 55 by member 57 whose end 61 is rigidly held to case 55, as by set screws 63, and which has a reduced resilient bending section 59. The handle and button assembly is adjusted so as to be normally coaxial with axis 42, but may be deflected in any radial direction by a transverse pressure on handle 11. The button 51 is thus mounted in cantilever fashion, all bending taking place approximately at the center C of the reduced diameter bending section 59. The motion of button 51 approximately follows the surface of a sphere having its center at point C, which is at the center of bending section 59. Because of this cantilever action, the deflection of the control handle 11 is closely proportional to the pressure applied to it. Since the tracking velocity of sight 1 may also be proportional to the deflection of handle 11, it will, in such case, be proportional to applied pressure. Hence, the operator gets a realistic "feel" of the operation, and can readily imagine that his own effort is controlling the sight directly. This makes it easier for the operator to accurately perform the required tracking.

Placed about sleeve 41 is an energizing coil 65, which is fed from a suitable source of alternating current. Around each arm, as for example arms 47, 49, there is wound a pick-up coil. Two such coils 67, 69 are shown. The entire device is made symmetrical about axis 42, so that equal voltages of equal phase will be induced in each pick-up coil when button 51 is coaxial with axis 42. Each pair of diametrically opposite coils is connected in series in opposing relation, so that, when button 51 is in its undeflected position, coaxial with axis 42, thereby making all four magnetic circuits identical, no resultant voltage is produced from each pair of pick-up coils, since the voltage induced in any one coil is opposed and cancelled by that of its diametrically opposite coil.

When handle 11 is deflected, for example, vertically downward, the air gaps between button 51 and arms 47, 49 will remain of the same length, since button 51 will pivot about its approximate center of curvature C; however, the cross-sectional area of the gap at arm 47 will decrease, increasing the reluctance of its magnetic circuit, and the area at arm 49 will increase, reducing the reluctance of its circuit. Hence more voltage will be induced in coil 69 than in coil 67, and there will be a net voltage output, indicating deflection along the vertical direction. No voltage will appear across the other pair of coils, in this instance, however, since their magnetic circuits remain balanced. For deflection upward, the opposite will occur, and the output voltage will be of opposite phase from that of the case first considered. For any other direction of deflection a component of voltage will appear across each pair of coils which will be proportional in magnitude to the component of deflection along the axis of that pair of coils, and will have a phase corresponding to the sense of the corresponding component of deflection. The unit is mounted so that one pair of coils has a vertical axis perpendicular to shaft 2 and the other a horizontal axis perpendicular to shaft 3. Then the control signal output of the vertical pair of coils is used to control the elevation of the sight 1 and the output of the horizontal pair is used to control azimuth, as will be described below.

Fig. 3 shows the circuit diagram for alternating current control in one plane, either in azimuth or elevation, the same circuit being duplicated for the other plane. The energizing coil 65 of control unit 9 is energized from a source 73 of alternating current by means of a current-limiting resistor 75 which minimizes saturation effects. The two oppositely positioned pick-up coils 67, 69 are connected in series opposition and are shunted by a condenser 77 whose function is to bypass the harmonics created by saturation of the edges of button 51. This condenser 77 may tune the output coils 67, 69 to resonance at line frequency. The voltage output from control unit 9 is then an alternating voltage of supply line frequency having an amplitude proportional to the deflection of control handle 11 (in elevation or azimuth) and a phase corresponding to the sense of the deflection. This control voltage is applied over coupling transformer 79 and conventional phase shifter 81 to amplifier 83, which amplifies the control voltage and applies it to one winding 85 of the two phase drive motor 17, the other winding 87 being connected directly to the supply line 73. Phase shifter 81 assures that the voltage applied to winding 85 is in quadrature with that applied to winding 87. Since the control voltage will reverse phase upon reversal of the control handle displacement, it will be seen that the direction of rotation of drive motor 17 will also reverse, and will accordingly correspond at all times to the direction of deflection of the control handle 11. The direction of rotation is selected so that downward pressure on handle 11 will drive the handle downward, thereby giving a realistic type of operation.

In order to assure that the speed of rotation of drive motor 17 will be proportional to the deflection of control handle 11, when this condition is desired, speed generator 19 is directly driven by drive motor 17. This speed generator is designed to have an alternating voltage output directly proportional to its speed. In one illustrative embodiment this generator may take the form of a Barber-Colman #412 reversible alternating current motor. This motor has an energizing winding 89 and a two-phase winding 91, 93, all fixed. The rotor 95 is of the squirrel cage type. It has been discovered that such a motor, when its winding 89 is energized and its rotor is turned, will generate voltages in its two-phase winding which, when added, will be closely proportional to the speed of rotation. Alternatively, this generator may take the form shown in Riggs Patent 2,206,920, issued July 9, 1940. Winding 89 is energized from supply line 73 through an adjustable phase shifting circuit 97. The windings 91, 93 are connected in series across a potentiometer 99 whose movable tap 101 is connected to the junction of the two-phase windings 91, 93. This tap 101 is adjusted so that at standstill there is zero voltage output. A condenser 100 is connected across windings 91, 93 to filter out undesired harmonics. The output of the speed generator 19 is connected to oppose or buck the control voltage produced in the control unit 9. Thus, the speed generator 19 and the output of control unit 9 are connected in series opposition across the primary of transformer 79. The phase adjustor 97 is used to assure that the voltage output of speed generator 19 is exactly in phase opposition to the control voltage obtained from control unit 9. Accordingly, it is substantially the arithmetic difference between these two voltages which operates the motor 17.

The magnitude of the voltage input to amplifier 83 needed to operate motor 17 at its full torque and speed is made very small compared to the voltage generated either by the speed generator or the control unit. The amplifier 83 is adjusted to saturate at this small voltage; that is, any voltage greater than this predetermined small voltage is ineffective to increase the amplifier output voltage, which remains at the motor full speed voltage. Of course, any amplifier input voltage smaller than the saturating voltage will yield an output voltage less than the motor full speed voltage, and the motor will rotate at less than full speed. As an illustrative example, the full-speed generator output, and the full deflection control voltage, may be about 30 volts, while the amplifier saturating voltage may be about 0.3 volt.

In operation, starting from a standstill, the control handle 11 may be partially deflected, for example, to give a control voltage of 20 volts. Since at this instant the speed generator 19 is at standstill, this control voltage is unopposed and is fully applied to the amplifier. However, due to the saturation effect in amplifier 83, only 0.3 volt is effective, which applies full starting torque to the motor, which therefore immediately accelerates at maximum rate. Acceleration will continue until the generator output differs from the control voltage only by sufficient voltage difference to maintain motor speed sufficient to yield that generator output. Since the voltage difference will be less than 0.3 volt, in the example used, it will be seen that the generator output voltage will be substantially equal to the control voltage, and, therefore, the motor speed, which provides the tracking velocity, is substantially proportional to the control voltage, and hence to the pressure (or deflection) applied to the control handle 11. Rheostat 103 is used to adjust the generator voltage to the proper value.

The function of prediction motor 21 is to position shaft 25 in accordance with certain prediction data, whereby the signals transmitted by synchro-transmitters 31, 33 will correspond to the position of the target at the future instant of impact by the projectile. The prediction data to be allowed for may include time of flight of the projectile, super-elevation, wind velocity, air density, etc.

The actual time of flight $t$ is determined by the range and altitude of the target. If the sight, and therefore the gun, is tracking at an angular velocity $\omega$, then the angular lead necessary to compensate the gun for time of flight $t$ will be $\omega t$. Since the speed generator 19 rotates at a speed proportional to the tracking speed, its output voltage will be proportional to $\omega$. In order to obtain a voltage proportional to $\omega t$, we use a potentiometer 105 connected across the output of the speed generator. The full generator voltage is assumed to correspond to maximum time of flight. This determines the proportionality factor between the voltage corresponding to the lead angle and the time of flight. For any other time of flight, the tap 107 of potentiometer 105 is adjusted so that only a fraction of the generator voltage, equal to the actual time of flight divided by maximum time of flight, is effective. In this way, a voltage proportional to $\omega t$ is obtained and the proportionality is maintained both for varying angular velocities of sight 1 and for varying times of flight. This voltage across the effective portion of potentiometer 105 is connected in series with other prediction voltages, connected to terminals 109, which represent the other factors to be compensated for. These other prediction voltages may be obtained in any suitable manner. Of course, each of these prediction voltages is made proportional to its required lead angle by the same proportionality factor as used for time of flight prediction. Hence, the total voltage represents, with a proportionality factor, the total lead angle necessary. Fig. 3 shows the means for positioning prediction motor 27 at this total lead angle in response to the prediction voltages.

Prediction motor 27 is mechanically coupled as by shaft 25 to prediction potentiometer 29. This potentiometer 29 is connected across transformer 111, which in turn is energized by current of line frequency from source 73.

A rate amplifier 113, which may be of any well known type which yields an output voltage containing time derivative components of the input voltage, of the first and/or higher orders, as well as amplified input components, has one input terminal 115 connected to terminal 109 of the prediction voltage input. The other terminal 109 is connected to one terminal 107 of the time of flight potentiometer 105, whose other terminal 106 is connected by lead 118 to the center tap 119 of the secondary of transformer 111. The other input terminal 117 of rate amplifier 113 is connected to the movable arm 121 of the prediction potentiometer 29. The output of the rate amplifier 113 is connected to one winding 123 of two-phase prediction motor 27, whose other winding 125 is energized directly from the supply line 73. Rate amplifier 113 may include any phase shifting circuits needed to insure phase quadrature between the voltages supplied to windings 123, 125 of motor 27.

When arm 121 of potentiometer 29 is at its center point 120, the voltage difference between points 120 and 119 is zero, and the only voltage applied to the input 115, 117 of rate amplifier 113 is the total prediction voltage. This voltage, operating through rate amplifier 113, will cause prediction motor 27 and potentiometer arm 121 to turn until the voltage between center point 120 and the new position of arm 121 of potentiometer 29 is equal and opposite to the prediction voltage, whereupon the input to amplifier 113 becomes zero and the prediction motor stops. Since potentiometer 29 is wound linearly (that is, with constant resistance per unit length) the angle between point 120 and arm 121 will then be exactly proportional to the total prediction voltage. This angle is also the angle through which shaft 25, and hence differential 21, has turned. Accordingly, the prediction voltage is thus transformed into the required lead angle, and the position transmitted by synchro-transmitters 31, 33 will be compensated for the required prediction data.

It is obvious that any change in any of the prediction voltages will cause an immediate and corresponding change in the position of the prediction motor, so that the correct lead angle is always set into differential 21.

Lead 118 may be connected directly to center point 120 of prediction potentiometer 29, instead of to center point 119 of transformer 111, as shown in Fig. 3, without changing the operation of the device.

Fig. 4 shows an alternative control circuit for the device of Fig. 1, using unidirectional control and prediction voltages instead of alternating voltages as in Fig. 3. The method of operation is quite similar.

Deflection of, or pressure on, control handle 11 generates alternating control voltages in pick-up coils 67, 69. These voltages are rectified in full-wave rectifiers 127, 129 and are then connected in series opposing relation. The dotted arrows near coils 67, 69 indicate the relative polarities of the voltages induced in the coils 67, 69. In place of rectifiers 127, 129, any phase-sensitive rectifier or demodulator may be used. The coils 67, 69 are connected in series opposition to form the input of such a demodulator. A suitable demodulator circuit is shown in Fig. 6.

The resultant direct voltage from the rectifiers 127, 129 (or demodulator of Fig. 6) is applied to the input of D. C. amplifier 131, wherein it is amplified. The output of D. C. amplifier 131 is connected in series bucking relationship to the output of speed generator 19', whose function and operation is the same as that of speed generator 19 in Fig. 3. However, generator 19' is a D. C. generator, either with a permanent magnet field or a field winding, energized by direct current, as will be described. Of course, the voltage ouput of generator 19' must be directly proportional to its speed.

The combined direct control and speed generator voltages are applied to modulator 135, which transforms the applied direct voltage into an alternating voltage of proportional amplitude, and of a phase corresponding to the polarity of the input. That is, the A. C. output voltage of modulator 135 reverses phase when the D. C. input voltage reverses polarity. Fig. 5 shows a suitable circuit which may be used as such a modulator. The operation of this circuit will be later explained.

The output of modulator 135 will be an alternating voltage whose phase corresponds to the direction of deflection of control handle 11 and whose amplitude is proportional to the amplitude of the control handle deflection. It will be understood that certain cases may require that this proportionality be not strictly observed. Any suitable relationship may be used. This output is fed into an A. C. amplifier and phase shifter 81, 83 similar to that in Fig. 3, whose output controls drive motor 17 as described above. Phase shifter 81 insures that the energization of field winding 85 of drive motor 17 is in quadrature with that of field winding 87.

Incorporated in the input circuit of modulator 135 is the integrating circuit 137 for effecting velocity plus acceleration tracking control. This circuit comprises a potentiometer 139 connected across the speed generator output and having a movable arm 141 connected through a resistor 142 to the fixed contact of a single-pole single-throw switch 143. Connected across the two fixed contacts of a single-pole double-throw switch 145 is a condenser 147. One terminal of this condenser 147 is connected to a terminal of the speed generator 19', while the other terminal is connected to the movable contact of switch 143. The movable contact of switch 145 is connected to one output terminal of D. C. amplifier 131 and also to a resistor 149 whose other side is connected to the input terminal 138 of modulator 135. Resistor 149 is selected to have a high value of resistance, and to give a large time constant with condenser 147. A potentiometer 153 is connected across the output of D. C. amplifier 131, and a switch 151 can selectively connect the input terminal 136 of modulator 135 to either the movable arm 155 or the fixed terminal 156 of potentiometer 153. The three switches 151, 143, 145 are mechanically ganged so as to be operated simultaneously.

In the switch position shown in Fig. 4, the circuit will operate with straight velocity tracking; that is, the drive motor velocity will be proportional or will at least correspond to the control handle deflection, as described above. In this position, condenser 147 is charged through current limiting resistor 142 to a voltage somewhat less than the generator voltage, by means of the potentiometer 139. The time constant of the charging circuit 142, 147 is made small so that the condenser voltage will closely follow changes in generator voltage. The charging voltage depends on the position of arm 141 of potentiometer 139.

When switches 143 and 145 are switched to their other positions, the voltage across condenser 147 is placed in opposition to the generator voltage, across resistor 149. The voltage across this resistor 149 will be the generator voltage less the condenser voltage. This difference voltage will be much less than the voltage across potentiometer 153, which at the moment of switching was substantially equal to the generator voltage. In order to prevent abrupt speed change of drive motor 17 due to the excess of the voltage across potentiometer 153 over the voltage across resistor 149, switch 151 is actuated simultaneously with switches 143 and 145, and acts to reduce the effective voltage output of D. C. amplifier 131 to a value nearer the difference voltage.

Since the generator output voltage is greater than the charged condenser 147 voltage, the generator 19' will tend to further charge condenser 147, through resistor 149. The voltage drop across resistor 149 produced by this charging current must be substantially equal and opposite to the voltage across the effective part of potentiometer 153; otherwise, the drive motor 17 will speed up or slow down so as to make the drop across resistor 149 have a value equal to that across potentiometer 153. If control handle 11 is held in constant deflected position, a constant voltage will be developed across potentiometer 153. However, the voltage drop across resistor 149 will tend to decrease, since the charging current of condenser 147 will decrease as full charge is approached. The only way in which the voltage drop across resistor 149 can be maintained equal to that across the effective part of potentiometer 153 is for the generator to continually increase velocity to maintain constant charging current. Hence control handle 11 becomes an acceleration control in addition to a velocity control, as it is with the switches 143, 145, 151 in their original position.

From another point of view, the generator voltage V must be equal to the sum of the voltage drop across resistor 149 and condenser 147. That is, $$V = iR + \frac{1}{c}\int i\,dt \qquad (I)$$

where R is the resistance of resistor 149, c is the capacitance of condenser 147 and i is the current flowing in the circuit. It is clear that V is proportional to the tracking speed s. Also, the drive motor circuit causes the drop across resistor 149 to be maintained practically equal to the control voltage, which is proportional to deflection D of control handle 11. Hence, iR is proportional to D, or i is proportional to D. Neglecting proportionality constants, the above equation may be transformed into $$s = D + \int D\,dt \qquad (II)$$

This last equation shows that the tracking control has both a velocity and an acceleration component. That is, a constant deflection D will give a certain constant component of tracking velocity, as shown by the first term of the right side of the equation, and in addition will give a constantly increasing tracking velocity component due to the integrating effect of the second term. Hence the control handle becomes both a velocity and an acceleration control.

If the control handle 11 is released, so that zero voltage appears across potentiometer 153, the motor will drop its speed until the generator voltage output equals the condenser voltage. Thereafter the motor will travel at constant velocity; if the velocity should change, charging or discharging current from condenser 147 will flow through resistor 149, whose voltage drop will control the motor to restore its speed. The drive motor can be made to slow down only by reversing the deflection of the control handle, which therefore acts again as an acceleration control.

With zero control voltage, D becomes zero, so that the first term of the equation disappears, leaving only the integration term. Hence, S will be maintained constant at the value of the integrated term.

The importance of the combined velocity and acceleration control arises from the methods used in tracking. When an object is sighted, it is desirable to accelerate the sight to overtake the object, and then keep it trained on the object. The present device permits such operation. Acceleration is provided by control handle deflection, whereby the object may be overtaken, then release of the handle 11 will permit the sight 1 to continue tracking at constant velocity.

A further advantage arises where the sight may be tracking by itself at the proper velocity, but behind the object. Then deflection of the control handle will apply enough additional tracking velocity, by the first term of the last equation, to enable the sight to overtake the object. Then release of the handle will permit the sight to resume practically the same tracking velocity as before, since the integration term of the equation will be little affected by the brief period of increased velocity.

Another useful method of operation is to use straight velocity tracking until the object is sighted. Then throwing the ganged switch of Fig. 4 to its other position will automatically continue the same tracking velocity, with the control handle at neutral.

Fig. 4 also shows a D. C. operated prediction control circuit which is quite similar to the prediction circuit of Fig. 3. The time-of-flight prediction voltage, which is proportional to the correction angle needed for time-of-flight correction, is derived as in Fig. 3 from time-of-flight potentiometer 105 connected across the output of speed generator 19'. This voltage is now a direct voltage since the speed generator output is a direct voltage.

The other prediction voltages may be obtained from a transformer 157 whose primary 159 is energized directly from the alternating supply source 73. Transformer 157 has plural similar secondary windings 161, shown in this instance, for illustrative purposes only, as four in number. Each secondary winding 161 corresponds to one prediction quantity to be compensated for. It will be clear that as many secondary windings may be used as desired.

Each secondary winding 161 is shunted by a centertapped resistor 163 of high resistance value, and by a potentiometer 165. The variable arm 167 of each potentiometer 165 is controlled in accordance with the value of the quantity for which prediction correction is required, in such fashion that the voltage between each variable arm 167 and its corresponding centertap of resistor 163 is proportional, by the same proportionality factor, to the prediction angle needed for correction of that quantity. This may be accomplished by driving the arms of linear wound potentiometers 165 from the mechanism which computes the required prediction angles, through cams which yield the required relationship, or by using direct drive and non-linear wound potentiometers 165 which will also yield the proper voltage-angle relationship. A suitable system is shown in Bond Patent 2,208,623. Any other means for obtaining these prediction voltages may be used.

These prediction voltages are added by being connected in series, as shown. Since these voltages are derived from similar plural secondary windings of the same transformer, their phase relationships will all be phase coincidence or phase opposition, so that they may be added arithmetically to produce the required resultant prediction voltage. The resultant is applied to the input of full-wave demodulator 169 by means of transformer 171. The circuit of a suitable demodulator is shown in Fig. 6. The output of this demodulator 169 is a direct voltage whose amplitude corresponds to the amplitude of the input alternating voltage and whose polarity corresponds to the phase of the input voltage.

The output direct voltage from demodulator 169 is connected in series with the direct time-of-flight prediction voltage, as in Fig. 3, to give the total prediction voltage.

The prediction potentiometer 29 has a circuit exactly the same as in Fig. 3, except that D. C. energization is used. The energizing potential for potentiometer 29 is obtained for alternating supply line 73 by means of full wave rectifier 173 having filter choke 175 and filter condenser 177. Choke 175 may be replaced by the field winding of speed generator 19' when an electromagnet field is used for that generator. In this way, since all the prediction circuit voltages are derived from the same source, namely, source 73, any fluctuation in source voltage will have equal proportional effect on all voltages, so that the circuit as a whole is independent of source voltage fluctuations. This arises from the fact that the balancing voltage from potentiometer 29 varies in the same way as the prediction voltages, upon any change in supply voltage.

As in Fig. 3, potentiometer 29 is rotated until the voltage between its arm and its center point balances the total prediction voltage. This is done by connecting the total prediction voltage and the potentiometer voltage in opposition across the input of device 179, which includes a D.-C. amplifier, a modulator which converts reversible polarity D.-C. into reversing phase A.-C., and an A.-C. amplifier. The modulator may be of the type shown in Fig. 5. Either or both the D.-C. and A.-C. amplifier may include rate circuits for insuring dead-beat and anti-hunting operation of prediction motor 27. Also, the A.-C. circuits in device 179 may include proper phase shifting apparatus to cause the voltage output to be in quadrature with the voltage of line 73, to insure proper operation of two-phase prediction motor 27. The operation of this circuit is the same as that of Fig. 3, and positions shaft 25 at the angle corresponding to the total prediction voltage.

Fig. 5 shows a push-pull modulator circuit suitable for use in the circuits of Fig. 4 as the modulator 135. This modulator circuit converts a reversing polarity D.-C. into a corresponding reversing phase A.-C. The direct input voltage is applied to input terminals 180, 181 and is amplified in conventional D.-C. amplifier 183, the amplified direct voltage appearing across centertapped resistor 185. This amplified voltage is applied in opposition to the two grids 187, 189 of a twin-triode tube 191 by means of a centertapped input resistor 193 whose center-tap 195 is connected to cathodes 197, 199 of twin-triode 191 by means of a cathode bias resistor 201. Grid current-limiting resistors 203 may be used to prevent excessive grid current, should any grid swing positive.

Anodes 205, 207 are connected to the outside terminals of center-tapped resistor 209 in parallel with one primary 211 of output transformer 213. A source of alternating current 223 of line frequency is connected between the center taps 195 and 215 of resistors 193 and 209, respectively.

Let it be assumed that, for a particular polarity of input voltage, grid 187 is positive with respect to centertap 195 and grid 189 negative. Then, on positive half cycles of the applied A.-C., anode 205 will have increased current, but anode 207 will have decreased current, compared to the current with zero input voltage to grids 187, 189. On negative half cycles neither anode will conduct. Hence, a voltage drop of a particular polarity appears across resistor 209, and only during positive half cycles of the supply voltage. This voltage drop will give a half-wave output from transformer 213 of one particular phase. If the input polarity were to reverse, making grid 189 positive with respect to point 195, and grid 187 negative, then, in the same way, anode 207 would have increased current, and anode 205 decreased current, and again only on positive half cycles of the applied A.-C. This would cause a voltage drop to appear across resistor 209 of opposite polarity, giving an output half-wave from transformer 213 of opposite phase from that of the first instance described. Thus, the phase of the output voltage is sensitive to the polarity of the input voltage.

In order to provide a full-wave output, which minimizes distorting harmonics, an exactly similar twin-triode 217 is used, with its input connected in parallel with the input to twin-triode 191. The output of tube 217 is connected to a second primary 219 of transformer 213 by a circuit identical to that of tube 191. The cathodes of tubes 191 and 217 are connected together as by conductor 221, and their anodes are energized from the same source. However, the anodes of tube 191 are energized in phase opposition with respect to the energization of the anodes of tube 217. This is accomplished by supplying both tubes from source 73 by means of a transformer 225 having a center-tapped secondary. The center tap 227 is connected to the center-tap 195 of input resistor 193, and the outer terminal of one secondary section 223 is connected to the anodes of tube 191 by means of the center-tap 215 of resistor 209, while the outer terminal of the other section 229 is connected in similar fashion to the anodes of tube 217.

As a result of this connection, tube 191 will conduct on half-cycles of the applied A.-C. of one polarity, while tube 217 will conduct on the half-cycles of opposite polarity. As described above, the phase of the output voltage will reverse when the polarity of the input voltage reverses. The device of Fig. 5 is therefore a full-wave modulator suitable for use with the circuit of Fig. 4.

Fig. 6 shows a full-wave demodulator suitable for use with the circuit of Fig. 4. The reversible phase A.-C. input is applied to the primary winding of transformer 231 which has a center-tapped secondary winding having two sections 233, 235. The voltage across section 233 is applied cophasally to grid 237 of twin-triode 241 and to grid 245 of tube 247. The voltage across section 235 is applied cophasally to grid 239 of tube 241 and to grid 243 of tube 247. Hence, the grids 237 and 239 of tube 241 are energized in phase opposition as are grids 243 and 245 of tube 247. Current limiting resistors 203 may be used. The cathodes of both tubes are connected together and to the center tap of the secondary winding of transformer 231. If desired, a fixed bias voltage may be inserted between points 234 and 240, or cathode bias resistors may be used in the cathode circuits of the two tubes.

The anodes 249 and 251 of tube 241 are energized in phase opposition from the secondary winding of a transformer 265 fed from the A.-C. source 73. The center tap of this secondary winding is connected to the cathodes by load resistor 257, which is by-passed by filter condenser 259. Anodes 253, 255 of tube 247 are energized in similar fashion from transformer 267 and have a similarly connected load resistor 261 and filter condenser 263. Transformers 265 and 267 are so connected that anodes 249 and 255, whose corresponding grids are cophasally energized, are energized in phase opposition. Also, anodes 251 and 253 are energized in phase opposition.

Across load resistors 257 and 261 connected in series, there is connected a filter circuit 269 for filtering out all A.-C. components, leaving only pure rectified D.-C. at output terminals 271, 273. This filter includes a choking transformer 275 having its terminal 271 and its secondary winding in series with terminal 273. Either primary or secondary winding, or both, may be tuned to the frequency of the predominating A.-C. component, which is twice the line frequency. A further by-pass condenser 277 is also used.

The input voltage to transformer 231 is of the same frequency as source 73, and is adjusted by any suitable means to be cophasal (or anti-phasal) with the voltage of source 73.

Let it be assumed that the phase of the input to transformer 231 is such that, at a particular instant of time to be considered, grids 237 and 245 are positive with respect to their cathodes, while grids 239 and 243 are negative. Furthermore, let it be supposed that at this same instant, anodes 249 and 253 are positive with respect to their cathodes, and anodes 251 and 255 are negative.

Then anode 249 will conduct, since both it and its grid are positive. Anode 251 will not conduct, being negative. Anode 253 will not conduct, its grid 243 being negative. Anode 255 will not conduct, being negative. Accordingly, a voltage will appear only across resistor 257, making output terminal 271 negative with respect to terminal 273.

In the succeeding half-cycle from the instant of time considered above, grids 237 and 245 will be negative, grids 239 and 243 will be positive, anodes 249 and 253 will be negative and anodes 251 and 255 will be positive. Hence, only anode 251 will conduct, the remaining anodes and/or grids being negative. Again current will be passed through resistor 257, and the same polarity of D.-C. output will be obtained.

If the input to transformer 231 should reverse phase, with respect to source 73, then, at one instant of time grids 237 and 245 would be negative, grids 239 and 243 would be positive, anodes 249 and 253 would be positive and anodes 251 and 255 would be negative. Under these conditions only anode 253 would conduct, yielding a D.-C. output of opposite polarity from that of the case considered above.

On the succeeding half-cycle, all polarities would reverse, and only anode 255 would conduct.

Accordingly, Fig. 6 gives a phase-sensitive, full-wave rectifier or demodulator, suitable for use in the circuit of Fig. 4.

In Figs. 4, 5 and 6, tubes 127, 129, 173, 183, 191, 217, 241 and 247 have been illustrated as being of the twin or duplex type. It is obvious that two separate single tubes could equally well be used. Also, tubes 183, 191, 217, 241 and 247 need not be of the triode type, as shown, but may be of any type of amplifier tube incorporating a control grid.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. A target tracking device comprising a sight, motive means for rotating said sight, generating means driven by said motive means for generating a unidirectional voltage dependent on the speed of rotation of said sight, control means for generating a unidirectional signal voltage corresponding to a desired speed of rotation of said sight, and means for controlling the speed of rotation of said motive means by the arithmetic difference of said voltages, whereby said sight will rotate at said desired speed.

2. A target tracking device as in claim 1, further comprising means for transmitting the orientation of said sight to a remote point, means connected to the output of said generator means for obtaining a prediction voltage corresponding to a desired angular correction of the orientation of said sight, and means under the control of said prediction voltage for compensating said orientation transmitting means for said angular correction.

3. A target tracking device comprising a sight, motive means for rotating said sight, generating means driven by said motive means for generating a speed voltage dependent upon the speed of rotation of said sight, control means for generating a signal voltage corresponding to a desired speed of rotation of said sight, means for obtaining a voltage corresponding to said speed voltage, and means for controlling the speed of rotation of said motive means by the algebraic sum of said signal voltage and the difference between said speed voltage and said obtained voltage whereby said motive means will continue to operate without signal voltage at a speed corresponding to said obtained voltage.

4. A target tracking device comprising a sight, motive means for rotating said sight, generating means driven by said motive means for generating a voltage dependent upon the speed of rotation of said sight, control means for generating a signal voltage corresponding to a desired speed of rotation of said sight, means for controlling the speed of rotation of said motive means by the arithmetic difference of said voltages, means for transmitting orientation of said sight to a remote point, means connected to the output of said generating means for obtaining a prediction voltage corresponding to a desired angular correction of the orientation of said sight, and means under the control of said prediction voltage for compensating said orientation transmitting means for said angular correction.

5. A target tracking device as in claim 3, in which said control means comprises a control handle mounted in cantilever fashion for deflection about a single point, a magnetic armature carried by said handle, two parallel magnetic paths bridged at one end by a magnetic member and at the other end by said armature, means for applying equal alternating magnetomotive forces to said two paths, a coil linking each path, whereby the voltage induced in each coil will depend upon the position of said armature, and means for connecting said coils in series opposition, whereby the voltage across both said series-connected coils will reverse phase as the armature passes through the position yielding equal coil voltages.

6. A control unit comprising a casing, a control handle fixed at one end within said casing for cantilever deflection with respect to said casing, four pickup coils having their axes parallel to the neutral undeflected axis of said handle and mounted equidistant from said neutral axis both radially and angularly, an energizing coil mounted coaxial with said neutral axis, open magnetic circuit means connecting said pickup coils with said energizing coil, a magnetic armature carried by said handle and positioned to complete said magnetic circuits, means for energizing said energizing coil from a source of alternating current, whereby voltages will be induced in said pickup coils of amplitudes depending on the position of said armature relative to said coils, means for balancing the voltages induced in oppositely disposed pickup coils with said armature in its neutral position, and means for connecting oppositely disposed pickup coils in series opposition, whereby the resultant voltage output from each pair of pickup coils will represent by its phase and magnitude the sense and magnitude of the component of deflection of said handle along the transverse axis of said pair of coils.

7. A control unit comprising a support, a cantilever carried by said support, a control handle arranged on said cantilever for displacement in any transverse direction relative to said support, the amount of displacement of said handle thereby being dependent upon the magnitude of pressure applied thereto, and means responsive to displacement of said handle for producing control voltages corresponding to the direction and magnitude of the pressure applied to said handle.

8. A control unit as in claim 7, wherein said voltage-producing means comprises a plurality of magnetic poles fixed with respect to said casing and carrying coils energized by alternating current, and a magnetic armature member fixed to said control handle for motion therewith.

9. A target tracking device comprising a sight, motive means for moving said sight, a control handle mounted for deflection about a single point, means responsive to deflection of said handle for moving said sight in a direction corresponding to the direction of deflection of said handle and at a speed corresponding to the magnitude of deflection of said handle, means for transmitting the instantaneous orientation of said sight to a remote point to control the orientation of a remotely situated gun, means to compensate the transmitted orientation for prediction data whereby the gun will be oriented toward the future position of the target, and means for causing the sight to continue tracking at substantially constant speed without deflection of said handle.

10. A target tracking device comprising a sight, motive means for moving said sight in azimuth, motive means for moving said sight in elevation, a control handle mounted for deflection in all transverse directions about a fixed point, means for controlling the velocity of said first motive means in response to the component of deflection of said control handle in a predetermined direction, means for controlling the velocity of said second motive means in response to the component of deflection of said control handle in a different predetermined direction, and means responsive to the speed of each of said motive means for supplying signals to said control means for operating said motive means in response to an integrated value of its corresponding component of handle deflection.

11. A target tracking device comprising a sight, motive means for orienting said sight, a control handle mounted for deflection, means for producing a control voltage in response to deflection of said handle, means for integrating said voltage over a period of time, and means for controlling said motive means both by said integrated voltage and by said control voltage.

12. A target tracking device comprising a sight, a control handle, a cantilever securing said handle on said sight permitting relative displacement in any transverse direction, the amount of displacement being dependent upon the magnitude of pressure applied thereto, and means responsive to pressure applied to said handle for moving said sight in a direction corresponding to the direction of said pressure and at a velocity corresponding to the magnitude of said pressure.

13. A control unit comprising a casing, a control handle mounted in cantilever fashion with respect to said casing for deflection in any radial direction with respect to the axis of its undeflected position, a stabilizing reference surface rigidly mounted on said casing and adjacent to said handle in a position to be used by an operator as a reference with respect to which said handle may be deflected, said surface and said handle being formed to conform to the contour of the hand of the operator whereby precise and steady deflection of said handle may be obtained, and means responsive to arbitrary deflection of said handle for producing voltages each corresponding in polarity and magnitude to the sense and magnitude of a component of said deflection in a predetermined direction.

14. A control system for a movable object comprising motive means for moving said object, generating means for generating a speed signal dependent upon the speed of said object, control means for producing a control signal, and means for controlling the speed of said motive means according to the difference between said control signal and the time derivative of said speed signal.

15. A control system for a movable object comprising motive means for moving said object, generating means for generating a speed signal dependent upon the speed of said object, a differentiating network connected to said generating means for obtaining the time derivative thereof, control means for producing a control signal, and means connected to said differentiating network and said control means for controlling the speed of said motive means according to the difference between said control signal and said time derivative signal.

16. A control system for a movable object comprising a motor for moving said object, a generator driven by said motor for generating a speed signal dependent upon the speed of said object, a condenser and resistance network connected to said generator for differentiating said speed signal, a control device for producing a control signal, and means for controlling the speed of said motor according to the difference between said control signal and said differentiated signal.

17. A target tracking device comprising a sight, motive means for rotating said sight, generating means driven by said motive means for generating a voltage dependent upon the speed of rotation of said sight, control means for generating a signal voltage corresponding to a desired speed of rotation of said sight, means for controlling the speed of rotation of said motive means by the arithmetic difference between said voltages, means for transmitting the orientation of said sight to a remote point, means connected to said generating means for obtaining a prediction voltage corresponding to a desired correction of the orientation of said sight, and means controlled by said prediction voltage for offsetting said orientation transmitting means relative to said sight in accordance with said correction whereby the desired corrected orientation is transmitted by said transmitting means.

18. A control system for a movable object comprising motive means for moving said object, generating means operated by said motive means for generating a first speed signal dependent upon the speed of said object, means connected to said generating means for producing a second speed signal opposing said first speed signal, control means for producing a control signal, and means for controlling the speed of said motive means according to the algebraic sum of said control signal and the difference between said speed signals.

19. A control system for a movable object comprising motive means for moving said object, generating means operated by said motive means for generating a first speed signal dependent upon the speed of said object, means connected to said generating means for producing a second speed signal opposing said first speed signal, a combining circuit connected to said generating means and said last-named means for combining said speed signals in opposition, control means for producing a control signal, and means connected to said combining circuit and said control means for controlling the speed of said motive means.

20. A control system for a movable object comprising motive means for moving said object, generating means operated by said motive means for generating a first speed signal dependent upon the speed of said object, a condenser connected to said generating means for producing a second speed signal in opposition to the signal from said generating means, control means for producing a control signal, and means for controlling the speed of said motive means according to the algebraic sum of said control signal and the difference between said speed signals.

21. A control system for a movable object comprising a motor for moving said object, a generator driven by said motor for producing a first speed signal dependent upon the speed of said object, a condenser connected in series with said generator, an impedance connected in parallel with said series circuit, control means for producing a control voltage, and means for controlling the speed of said motor according to the algebraic sum of said control voltage and the voltage across said impedance.

22. Tracking apparatus comprising a sight, a motor for turning said sight, a generator driven by said motor for producing a first speed voltage dependent upon the speed of said sight, means connected to said generator for producing a second speed voltage in opposition to said first speed voltage, control means for producing a control voltage, and means for controlling the speed of said motor according to the algebraic sum of said control voltage and the difference between said speed voltages.

23. A tracking control comprising a controller and a driven object, motive means for rotating the latter, a generator driven by said means producing a voltage proportional to the rotary speed of said object, means at the controller producing a voltage proportional to a desired speed of said object, other means deriving a voltage corresponding to said generator voltage, and means for opposing said generator voltage by said derived voltage whereby said motive means will maintain its speed for a time without a controller voltage.

HARVARD L. HULL.
WILLIAM C. HARTMAN.
RAYMOND C. GOERTZ.